(12) United States Patent
Hu et al.

(10) Patent No.: US 11,015,444 B2
(45) Date of Patent: May 25, 2021

(54) METHOD FOR PREDICTING THE OPTIMAL SHUT-IN DURATION BY COUPLING FLUID FLOW AND GEOLOGICAL STRESS

(71) Applicant: SOUTHWEST PETROLEUM UNIVERSITY, Chengdu (CN)

(72) Inventors: Yongquan Hu, Chengdu (CN); Qiang Wang, Chengdu (CN); Jinzhou Zhao, Chengdu (CN); Lan Ren, Chengdu (CN); Chenghao Fu, Chengdu (CN); Chaoneng Zhao, Chengdu (CN); Jin Zhao, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/923,083

(22) Filed: Jul. 8, 2020

(65) Prior Publication Data
US 2020/0332655 A1  Oct. 22, 2020

(30) Foreign Application Priority Data
Jul. 8, 2019 (CN) .......................... 201910609637.3

(51) Int. Cl.
*G01V 99/00* (2009.01)
*G06F 111/10* (2020.01)
(Continued)

(52) U.S. Cl.
CPC ........ *E21B 49/006* (2013.01); *E21B 43/2605* (2020.05); *E21B 49/003* (2013.01);
(Continued)

(58) Field of Classification Search
CPC .. E21B 49/006; E21B 43/2605; E21B 49/003; E21B 49/008; E21B 2200/20;
(Continued)

(56) References Cited

U.S. PATENT DOCUMENTS

2004/0016541 A1* 1/2004 Detournay ............. E21B 43/26
166/250.1

FOREIGN PATENT DOCUMENTS

| CN | 108830020 B | * | 5/2019 | ............. G06F 30/20 |
| CN | 108952660 B | * | 5/2019 | ............. E21B 43/26 |

OTHER PUBLICATIONS

Feng, Yongcun, Xiaorong Li, and K. E. Gray. "Modeling field injectivity tests and implications for in situ stress determination." International Journal of Geomechanics 18.9 (2018). pp. 04018101-1-04018101-12. (Year: 2018).*

(Continued)

*Primary Examiner* — Kamini S Shah
*Assistant Examiner* — John E Johansen (57) ABSTRACT

The invention discloses a method for predicting the optimal shut-in duration by coupling fluid flow and geological stress, comprising the following steps: determine basic parameters; obtain the fracture length, fracture width and reservoir stress distribution based on the basic parameters; calculate the oil saturation, pore pressure, and permeability and porosity after coupling change in different shut-in durations on the basis of the principle of fluid-solid coupling; take the oil saturation, pore pressure, and permeability and porosity obtained in Step 3 as initial parameters and calculate the production corresponding to different shut-in time on the basis of the productivity model; finally select the optimal shut-in time based on the principle of fastest cost recovery. The present invention can accurately predict the optimal shut-in duration after fracturing to improve the oil and gas recovery ratio in tight oil and gas reservoirs with difficulty in development and low recovery.

2 Claims, 5 Drawing Sheets

(51) Int. Cl.
  *E21B 49/00* (2006.01)
  *E21B 43/26* (2006.01)
  *E21B 43/30* (2006.01)
  *G06F 113/08* (2020.01)
(52) U.S. Cl.
  CPC .......... *E21B 49/008* (2013.01); *G01V 99/005* (2013.01); *E21B 43/305* (2013.01); *E21B 2200/20* (2020.05); *G06F 2111/10* (2020.01); *G06F 2113/08* (2020.01)
(58) Field of Classification Search
  CPC ..... E21B 43/305; E21B 43/26; G01V 99/005; G06F 2113/08; G06F 2111/10; G06Q 10/04; G06Q 50/02
  USPC .......................................................... 703/10
  See application file for complete search history.

(56) References Cited

OTHER PUBLICATIONS

Yu, Wei, et al. "A numerical model for simulating pressure response of well interference and well performance in tight oil reservoirs with complex-fracture geometries using the fast embedded-discrete-fracture-model method." SPE Reservoir Evaluation & Engineering 21.02 (2018). pp. 489-502. (Year: 2018).*

Roussel, Nico Patrick, Horacio Florez, and Adolfo Antonio Rodriguez. "Hydraulic fracture propagation from infill horizontal wells." SPE annual technical conference and exhibition. Society of Petroleum Engineers, 2013. pp. 1-18. (Year: 2013).*

Zhao, Jinzhou, et al. "Numerical investigation of shut-in time on stress evolution and tight oil production." Journal of Petroleum Science and Engineering 179 (2019). pp. 716-733. (Year: 2019).*

* cited by examiner

METHOD FOR PREDICTING THE OPTIMAL SHUT-IN DURATION BY COUPLING FLUID FLOW AND GEOLOGICAL STRESS

TECHNICAL FIELD

The present invention relates to a shut-in measure after hydraulic fracturing and stimulation for unconventional tight reservoir, in particular to a method for predicting the optimal shut-in duration by coupling fluid flow and geological stress.

DESCRIPTION OF PRIOR ART

In recent years, with the increase in people's living standard, the total consumption of oil and natural gas is also increased year by year. Learned from the current status of domestic oil and gas exploration, the conventional oil and gas resources have entered the middle and late stages of production, and most reservoirs with high quality have been developed, so the overall production is decreased year by year. In this context, unconventional tight oil and gas resources are beginning to be valued. However, unconventional tight reservoirs have some problems, such as complex reservoir environment, low permeability and porosity, poor fluidity, strong heterogeneity, rapid decline in productivity, and reservoir lithology sensitivity. Therefore, how to use existing theories reasonably and effectively to guide on-site stimulation is particularly important.

Unconventional tight reservoirs are generally defined as those with a permeability of less than 0.1 mD and a porosity of less than 10%. Most of the researches on shut-in in tight reservoirs are based on the dialysis-oil-water displacement (Meng Q., Liu H., Wang J. 2017. A critical review on fundamental mechanisms of spontaneous imbibition and the impact of boundary condition, fluid viscosity and wettability. Advances in Geo-Energy Research, 1(1):1-17; Zhang H. 1999. Study on the effect and influence factors of imbibition in fractured reservoir. Oil and Gas Recovery Technology, 6(2): 51-56) and wetting inversion. At present, the research in this field is mainly to simulate the dialysis process through laboratory physical experiments (Wang Jing, Liu Huiqing, Xia Jing, et al. Mechanism simulation of oil displacement by imbibition in fractured reservoirs [J]. Petroleum Exploration and Development, 2017, 44 (5): 761-770; Qu Xuefeng, Lei Qihong, Gao Wubin, et al. Experimental study on imbibition of Chang7 tight oil cores in Erdos Basin [J] Journal of China University of Petroleum, 2018, 42 (2): 102-109). Although this method can study the mechanism of imbibition in the shut-in process from the perspective of microscopic mechanism, it is not enough to fully prove the principle of stimulation by shut-in. The study from the perspective of chemical mechanism ignores the stress interference caused by hydraulic fracturing before shut-in, fluid-solid coupling, pore elasticity, and the reservoir quality evolution and oil-water migration in the shut-in process. Therefore, the study only from the point of chemical mechanism is not comprehensive.

The study on the optimal shut-in duration by coupling fluid flow and geological stress is to find the relationship between the shut-in time and the productivity by establishing the hydraulic fracturing model, the shut-in model and the corresponding productivity simulation model before shut-in, and then find the optimal shut-in duration under the condition of same injection rate and same total injection amount. This method considers the effect of stress interference caused by fracture opening during hydraulic fracturing on reservoir pore elasticity, oil-water exchange during different shut-in periods, and productivity prediction after the end of shut-in. The innovative feature of this method is to find the relationship between shut-in time and productivity from the perspective of coupling fluid flow and geological stress and then determine the optimal shut-in duration. This method is suitable for predicting the optimal shut-in duration for tight reservoirs, but not for reservoirs with high porosity and permeability.

According to a large number of literature researches, it is found that there is no research on the method for predict the shut-in time by coupling fluid and geological stress. Due to the severe international energy shortage currently, tight oil and gas, shale and other unconventional reservoirs are gradually concerned. The proposed method is of great significance to the development of unconventional oil and gas resources and the improvement of recovery ratio, and has a profound influence on easing the current shortage of oil and gas. At the same time, it also promotes the study of oil and gas development theory to some extent.

SUMMARY OF THE INVENTION

The present invention proposes a method for predicting the optimal shut-in duration by coupling fluid flow and geological stress to overcomes the shortcomings in the prior art. The present invention can predict the optimal shut-in duration after the end of fracturing, thereby improving the recovery ratio.

The technical solution provided by the present invention to solve the above technical problems is: a method for predicting the optimal shut-in duration by coupling fluid flow and geological stress, comprising the following steps:

Step 1: Establish a simulated physical model range to determine the basic parameters based on geological parameters, construction parameters, boundary conditions and initial conditions;

Step 2: Establish a fracture propagation and stress interference model to obtain the fracture length, fracture width and reservoir stress distribution based on the basic parameters, in combination with the Reynolds equation, the fracture width equation and the reservoir elastic deformation equation;

Step 3: Take the fracture length, fracture width and reservoir stress distribution obtained in Step 2 as the initial parameters, and calculate the oil saturation, pore pressure, and permeability and porosity after coupling change in different shut-in durations on the basis of the principle of fluid-solid coupling;

Step 4: Take the oil saturation, pore pressure, and permeability and porosity obtained in Step 3 as initial parameters and calculate the production corresponding to different shut-in time on the basis of the productivity model, and finally select the optimal shut-in time based on the principle of fastest cost recovery.

A further technical solution is that the geological parameters include initial permeability, initial porosity, elastic modulus and Poisson's ratio, and the construction parameters include injection displacement and fracturing fluid viscosity.

A further technical solution is that the following equation applies to the establishment of the fracture propagation and stress interference model is established based on the Reynolds equation, the fracture width equation and the reservoir elastic deformation equation in Step 2:

$$W(x) = \frac{2(1-v^2)H(P_f(x) - \sigma_n)}{E}$$

$$\frac{\pi}{64\mu_f} \frac{\partial}{\partial x}\left(w^3 \frac{\partial(P_f - \sigma_n)}{\partial x}\right) = \frac{K\Delta x H \partial P_f}{\mu_f \partial y} + \frac{\pi}{4}\frac{\partial W}{\partial t}$$

$$Q_0 = \int 4HFdx + \frac{\pi H}{4}\int \frac{\Delta W}{\Delta t}dx$$

$$L_f = L_0 + \sum_{j=0}^{k} \Delta x_j$$

$$G\nabla^2 u_i + (G+\lambda)\frac{\partial}{\partial x_i}(\nabla \cdot u) = \alpha_p \frac{\partial p}{\partial x_i}$$

$$\sigma_{ij} = 2G\varepsilon_{ij} + \lambda\varepsilon_v \delta_{ij} - \alpha_p p\delta_{ij}$$

Where, W is the fracture width, in m; H is the fracture height, in m; E is the elastic modulus of the reservoir, in MPa; t is the construction time, in d; x is the abscissa of the model, in m; y is the ordinate of the model, in m; $\Delta x$ is the unit length of the fracture, in m; $P_f$ is the fracture fluid pressure, in MPa; $\mu_f$ is the viscosity of the injected fluid, in mPa·s; v is the Poisson's ratio of the reservoir rock, dimensionless; $\sigma_n$ is the minimum horizontal principal stress, in MPa; K is the fracture wall permeability, in $\mu m^2$; $Q_0$ is the injection rate, in $m^3/d$; F is the fluid loss rate, in m/d; $L_f$ is the fracture length, in m; $L_0$ is the initial length of the fracture, in m; k is the total number of fracture division units, dimensionless; j is the $j^{th}$ fracture unit, dimensionless; G is the shear modulus of the rock, in MPa; $\lambda$ is the Lame constant, in MPa; $\delta_{ij}$ is the Kronecker symbol; p is the pore pressure, in MPa; $\varepsilon_{ij}$ is the strain component, dimensionless; $\varepsilon_v$ is the volumetric strain, dimensionless; $\alpha_p$ is the Biot constant, dimensionless; $u_i$ is the displacement of the reservoir in the i direction, in m; u is the displacement tensor, in m.

A further technical solution is that the calculation equation in Step 3 is:

$$\nabla \cdot \left(\rho_1 \frac{KK_r}{\mu_1} \nabla p\right) + q_v = \frac{\partial(\phi \rho S)}{\partial t} - \rho S \alpha_p \frac{\partial \varepsilon_v}{\partial t}$$

$$\phi = \phi_i \frac{e^{-c_\phi \Delta \sigma}}{1 - \phi_i(1 - e^{-c_\phi \Delta \sigma})}$$

$$K = K_i \frac{e^{-c_\phi \Delta \sigma}}{1 - \phi_i(1 - e^{-c_\phi \Delta \sigma})}$$

Where, $\rho_1$ is the fluid density, in $kg/m^3$; K is the absolute permeability of the reservoir, in mD; $K_r$ is the relative permeability of the reservoir, dimensionless; $\mu_1$ is the viscosity of the reservoir fluid, in mPa·s; $q_v$ is the source sink term in the reservoir, in $m^3/min$; t is the construction time, in d; $\phi$ is the porosity, dimensionless; S is the fluid saturation, dimensionless; $\phi_i$ is the initial porosity, dimensionless; $K_i$ is the initial permeability, dimensionless; $\Delta \sigma$ is the stress difference, in MPa; $c_\phi$ is the compressibility of reservoir rock, in $MPa^{-1}$.

A further technical solution is that the productivity model in Step 4 is:

$$q_{iwell} = \rho_1 \frac{KK_r}{\mu_1} \frac{2\pi H}{\ln(r_e/r_w) + a}(p - p_w)$$

Where, $q_{iwell}$ is the exchange term between fracture and production well, in $m^3$; H is the fracture height, in m; K is the absolute permeability of the reservoir, in mD; $K_r$ is the relative permeability of the reservoir, dimensionless; $\mu_1$ is the viscosity of the reservoir fluid, in mPa·s; $r_e$ is the effective radius of the production well, in m; $r_w$ is the well radius, in m; a is the correction factor, dimensionless; p is the pore pressure, in MPa; $p_w$ is the downhole pressure, in MPa.

The present invention has the following advantages: the present invention can accurately predict the optimal shut-in duration after fracturing to improve the oil and gas recovery ratio in tight oil and gas reservoirs with difficulty in development and low recovery. With this method, take into account the influence of stress interference caused by the fracturing, consider this case as the initial condition of the shut-in process, then work out the changes in stress and physical properties in the shut-in process based on the principle of fluid-solid coupling, take the results after the shut-in as the initial conditions of the productivity model, then obtain the productivity in different shut-in durations, and finally select the optimal shut-in time based on the principle of fastest cost recovery. The proposed method can provide a reliable reference for optimizing the shut-in time after the development and fracturing of tight reservoirs, and also promotes the development of this technology in the theoretical research of oil and gas development.

DETAILED DESCRIPTION OF THE PREFERRED EMBODIMENTS

The present invention will be further described with the following embodiments and figures.

The method for predicting the optimal shut-in duration by coupling fluid flow and geological stress disclosed in the present invention includes the following steps:

Step 1: Obtain the geological parameters by field logging and well testing, and establish the simulated physical model range to determine the basic parameters based on geological parameters, construction parameters, boundary conditions and initial conditions;

The geological parameters include initial permeability, initial porosity, elastic modulus and Poisson's ratio, and the construction parameters include injection displacement and fracturing fluid viscosity;

Step 2: Establish a fracture propagation and stress interference model to obtain the fracture length, fracture width and reservoir stress distribution based on the basic parameters, in combination with the Reynolds equation, the fracture width equation and the reservoir elastic deformation equation;

The calculation equations of the above steps are Equations (1), (2), (3), (4), (5) and (6);

$$W(x) = \frac{2(1-v^2)H(P_f(x) - \sigma_n)}{E} \quad (1)$$

-continued $$\frac{\pi}{64\mu_f}\frac{\partial}{\partial x}\left(W^3\frac{\partial(P_f-\sigma_n)}{\partial x}\right) = \frac{K\Delta xH\partial P_f}{\mu_f\partial y} + \frac{\pi}{4}\frac{\partial W}{\partial t} \quad (2)$$

$$Q_0 = \int 4HFdx + \frac{\pi H}{4}\int\frac{\Delta W}{\Delta t}dx \quad (3)$$

$$L_f = L_0 + \sum_{j=0}^{k}\Delta x_j \quad (4)$$

$$G\nabla^2 u_i + (G+\lambda)\frac{\partial}{\partial x_i}(\nabla \cdot u) = \alpha_p\frac{\partial p}{\partial x_i} \quad (5)$$

$$\sigma_{ij} = 2G\varepsilon_{ij} + \lambda\varepsilon_v\delta_{ij} - \alpha_p p\delta_{ij} \quad (6)$$

Where, W is the fracture width, in m; H is the fracture height, in m; E is the elastic modulus of the reservoir, in MPa; t is the construction time, in d; x is the abscissa of the model, in m; y is the ordinate of the model, in m; $\Delta x$ is the unit length of the fracture, in m; $P_f$ is the fracture fluid pressure, in MPa; $\mu_f$ is the viscosity of the injected fluid, in mPa·s; v is the Poisson's ratio of the reservoir rock, dimensionless; $\sigma_n$ is the minimum horizontal principal stress, in MPa; K is the fracture wall permeability, in $\mu m^2$; $Q_0$ is the injection rate, in $m^3/d$; F is the fluid loss rate, in m/d; $L_f$ is the fracture length, in m; $L_0$ is the initial length of the fracture, in m; k is the total number of fracture division units, dimensionless; j is the $j^{th}$ fracture unit, dimensionless; G is the shear modulus of the rock, in MPa; $\lambda$ is the Lame constant, in MPa; $\delta_{ij}$ is the Kronecker symbol; p is the pore pressure, in MPa; $\varepsilon_{ij}$ is the strain component, dimensionless; $\varepsilon_v$ is the volumetric strain, dimensionless; $\alpha_p$ is the Biot constant, dimensionless; $u_i$ is the displacement of the reservoir in the i direction, in m; u is the displacement tensor, in m.

Step 3: Substitute the fracture length, fracture width and reservoir stress distribution obtained in Step 2 into Step 3 as the initial conditions; then, based on the principle of fluid-solid coupling, calculate the oil saturation and pore pressure in different shut-in durations by Equation (7), and work out the permeability and porosity after coupling change by Equations (8) and (9);

$$\nabla \cdot \left(\rho_1\frac{KK_r}{\mu_1}\nabla p\right) + q_v = \frac{\partial(\phi\rho S)}{\partial t} - \rho S\alpha_p\frac{\partial\varepsilon_v}{\partial t} \quad (7)$$

$$\phi = \phi_i\frac{e^{-c_\phi\Delta\sigma}}{1-\phi_i(1-e^{-c_\phi\Delta\sigma})} \quad (8)$$

$$K = K_i\frac{e^{-c_\phi\Delta\sigma}}{1-\phi_i(1-e^{-c_\phi\Delta\sigma})} \quad (9)$$

Where, $\rho_1$ is the fluid density, in $kg/m^3$; K is the absolute permeability of the reservoir, in mD; $K_r$ is the relative permeability of the reservoir, dimensionless; $\mu_1$ is the viscosity of the reservoir fluid, in mPa·s; $q_v$ is the source sink term in the reservoir, in $m^3/min$; t is the construction time, in d; $\phi$ is the porosity, dimensionless; S is the fluid saturation, dimensionless; $\phi_i$ is the initial porosity, dimensionless; $K_i$ is the initial permeability, dimensionless; $\Delta\sigma$ is the stress difference, in MPa; $c_\phi$ is the compressibility of reservoir rock, in $MPa^{-1}$.

Step 4: Take the oil saturation, pore pressure, and permeability and porosity obtained in Step 3 as initial parameters and calculate the production corresponding to different shut-in time on the basis of the productivity model, and finally select the optimal shut-in time based on the principle of fastest cost recovery.

$$q_{1well} = \rho_1\frac{KK_r}{\mu_1}\frac{2\pi H}{\ln(r_e/r_w)+a}(p-p_w) \quad (10)$$

Where, $q_{1well}$ is the exchange term between fracture and production well, in $m^3$; H is the fracture height, in m; K is the absolute permeability of the reservoir, in mD; $K_r$ is the relative permeability of the reservoir, dimensionless; $\mu_1$ is the viscosity of the reservoir fluid, in mPa·s; $r_e$ is the effective radius of the production well, in m; $r_w$ is the well radius, in m; a is the correction factor, dimensionless; p is the pore pressure, in MPa; $p_w$ is the downhole pressure, in MPa.

Embodiment 1

A block in Qinghai Oilfield has the typical characteristics of tight oil reservoir. The geological data of the block is obtained with field logging and well testing, and the parameters acquired are representative, that is, the reservoir has the characteristics of low porosity and low permeability.

Figure 1:
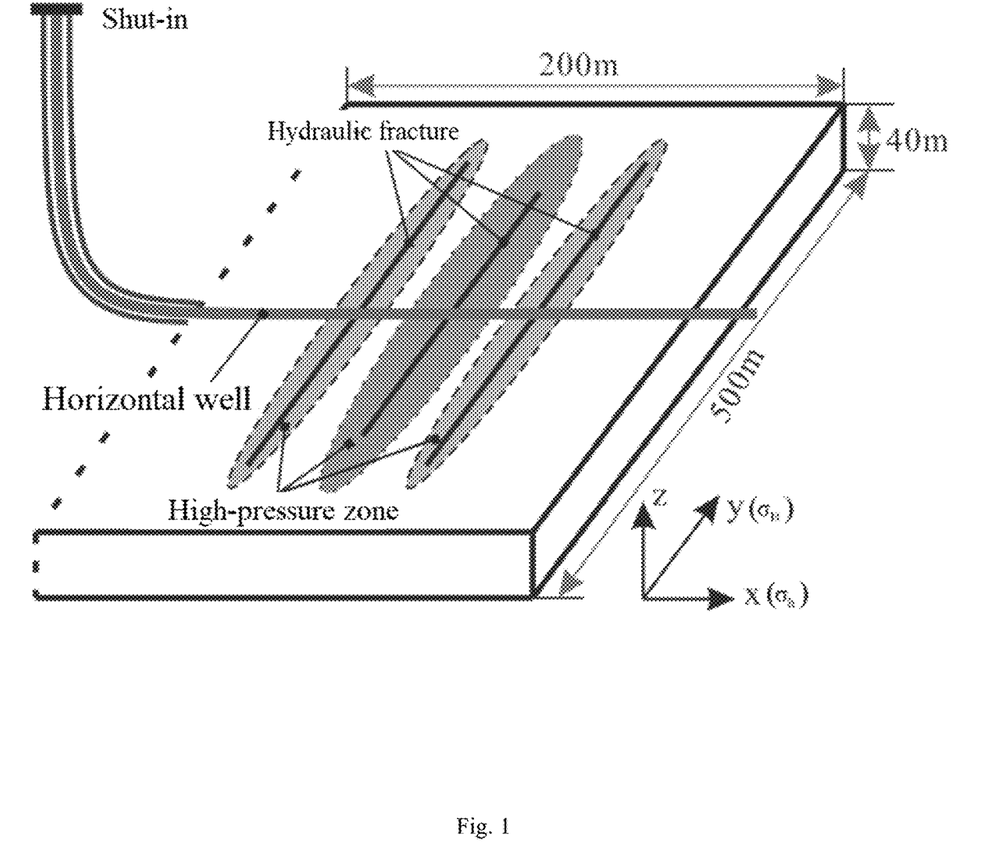
FIG. 1 is a model diagram.

The schematic diagram of the simulated physical model is shown in FIG. 1. The specific steps are described as follows:

1. Obtain the geological parameters by field logging and well testing: the injection displacement is 7 $m^3/min$, the fracturing fluid viscosity is 1.1 mPs·s, the fracture spacing is 20 m, the number of fracture clusters is 3, the Poisson's ratio of the rock is 0.25, the rock elastic modulus is 28,799 MPa, the initial oil saturation is 0.65, the initial absolute permeability of the reservoir is 0.1 mD, the initial porosity is 0.15, the density of crude oil is 964 $kg/m^3$, the density of reservoir water is 980 $kg/m^3$, and the oil viscosity is 1.25 mPs·s, the water viscosity is 1.1 mPs·s, the initial pore pressure is 15 MPa, the maximum principal stress is 30 MPa, the minimum principal stress is 27 MPa, and the Biot effective constant is 1.

Figure 2:
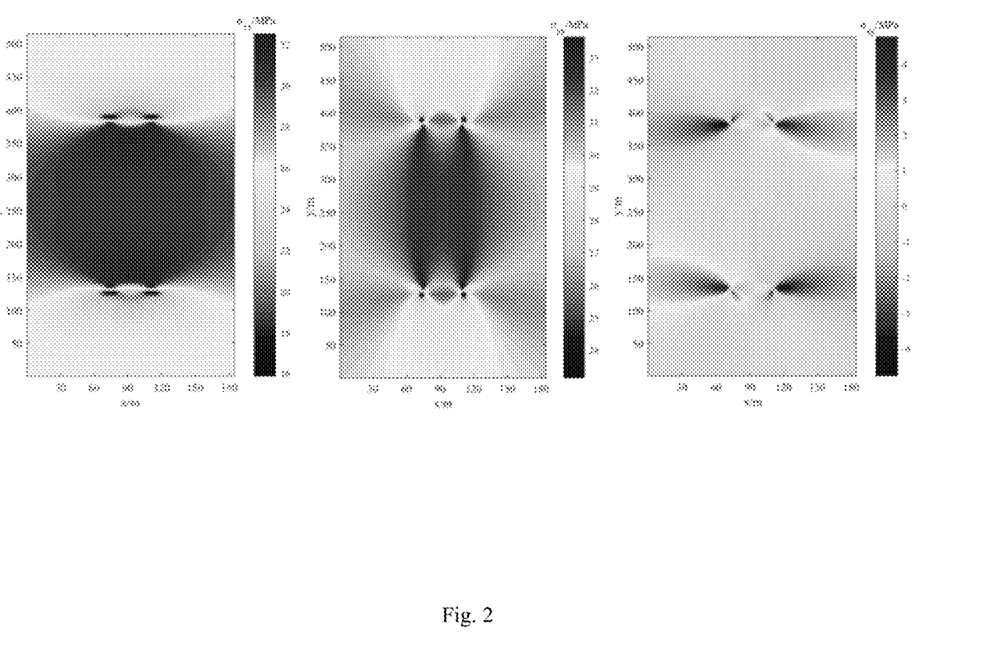
FIG. 2 is a diagram of stress distribution after fracturing.

2. Use simultaneous Equations (1), (2), and (3) to obtain two equations with two unknowns by the finite difference method, then use the Picard iteration method to obtain the fracture width in the length direction of the fracture, the fluid pressure distribution in the fracture and the fracture length distribution, and use the stress-strain equations and stress-displacement equations of Equations (5) and (6) to obtain the induced stress distribution generated by hydraulic fracturing (as shown in FIG. 2).

Figure 3:
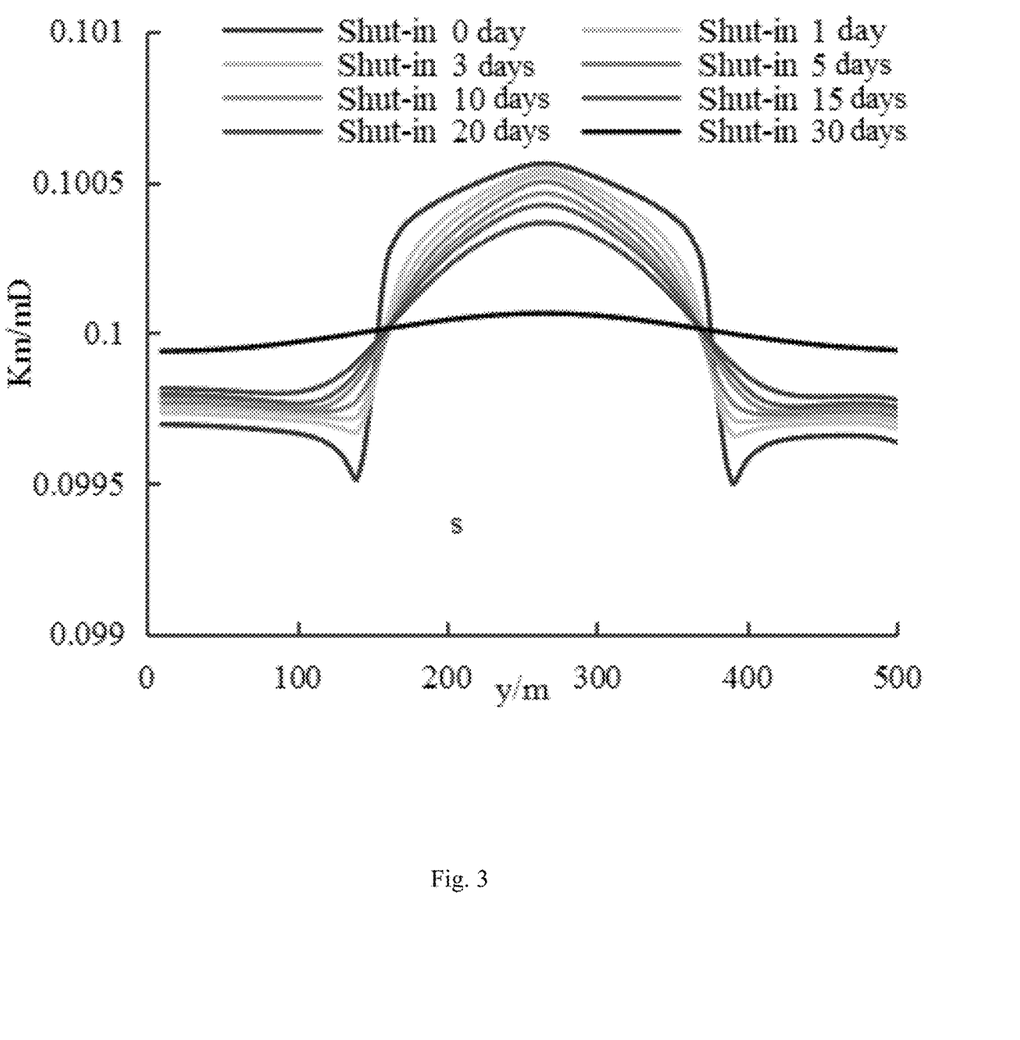
FIG. 3 is a curve of permeability changing with time in shut-in process.
Figure 4:
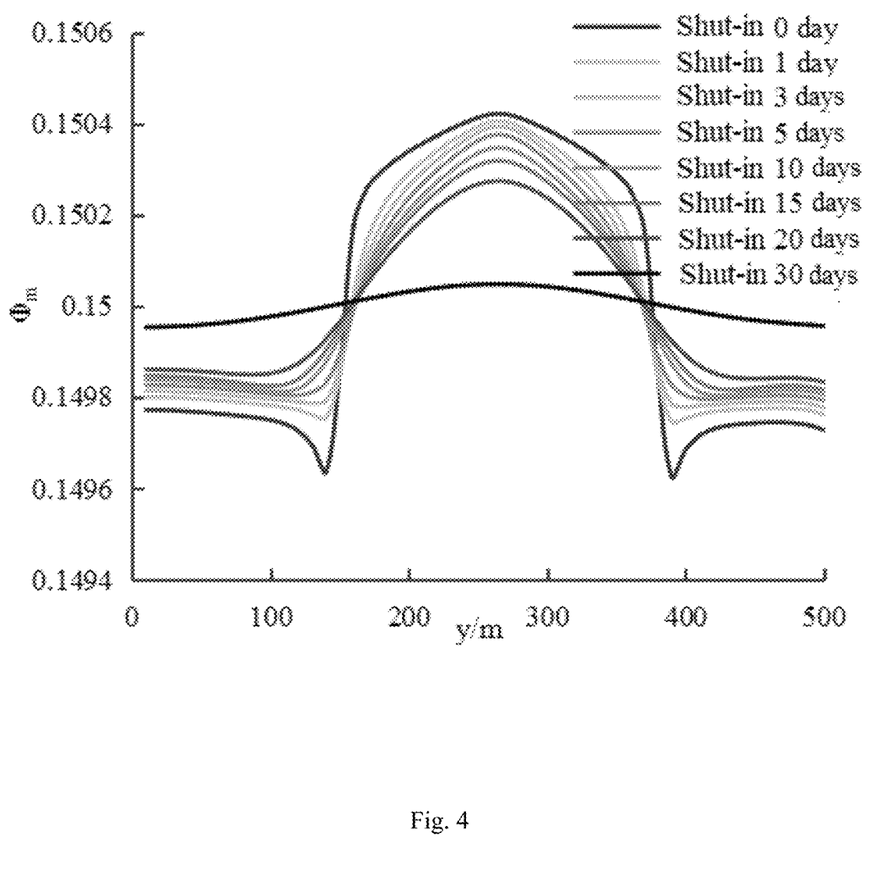
FIG. 4 is a curve of porosity changing with time in shut-in process.

3. In Step 3, link and solve Equations (5) and (7) and use the five-point difference method to obtain the discrete form of Equations (5) and (7); work out the pore pressure and saturation distribution at first and then work out the induced stress caused by the pore pressure based on the principle of fluid-solid coupling; calculate the permeability and porosity distribution (as shown in FIGS. 3 and 4) after considering the fluid-solid coupling changes by Equations (8) and (9). According to the selection of different well times, the calculation process can be cycled multiple times to obtain the distribution of parameters such as permeability and porosity in different shut-in durations.

Figure 5:
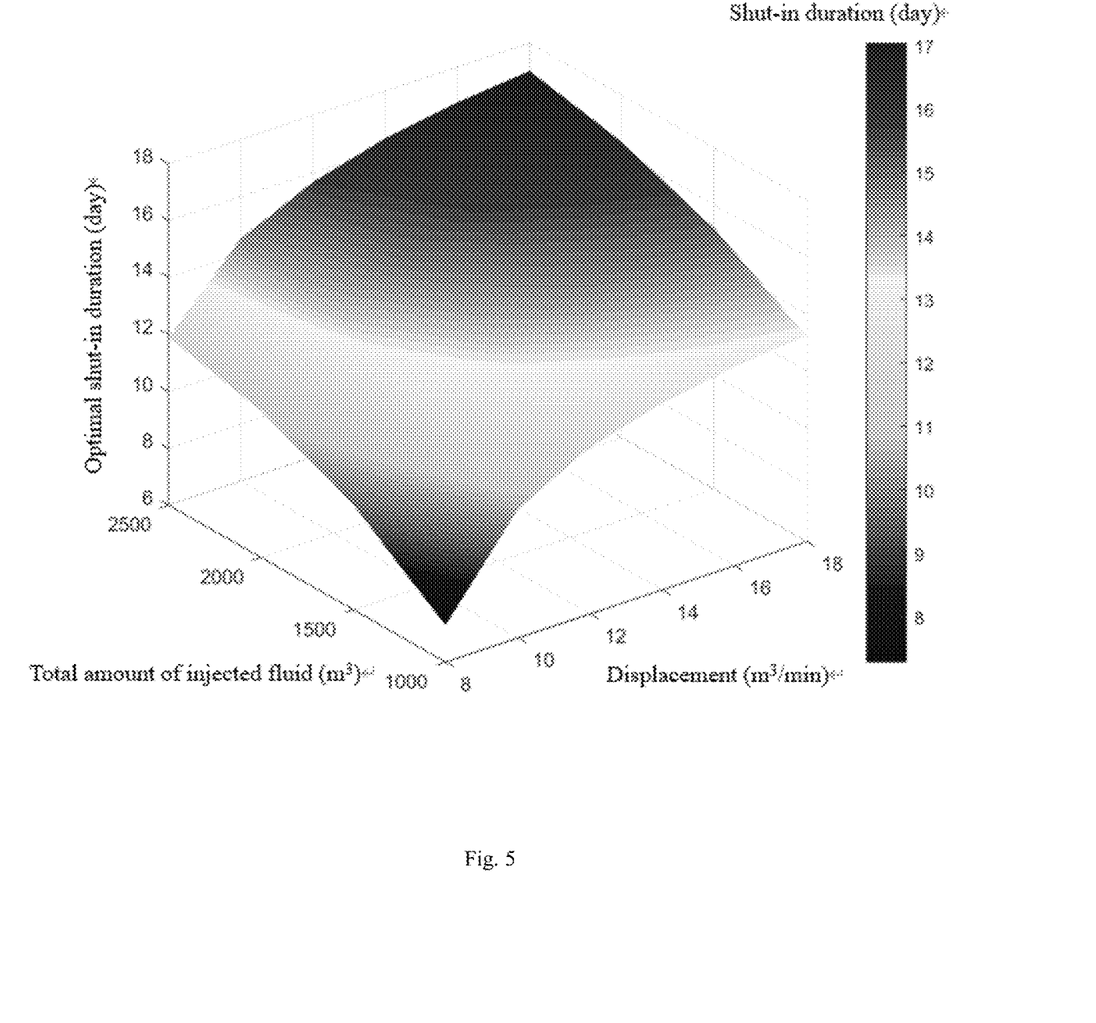
FIG. 5 is a diagram of relationship between the optimal shut-in duration, displacement and total injection volume.

4. Finally, take the obtained pore pressure, permeability, porosity and saturation as the initial conditions of the productivity model, and then obtain the productivity in different shut-in durations by Equation (10), and select the optimal shut-in duration according to production optimization. The diagram shown in FIG. 5 can be obtained according to the construction parameters concerned on site and the optimal shut-in duration obtained by simulation.

According to the simulation steps of the present invention, the optimal shut-in duration can be worked out for the blocks with different geological parameters, and the working system can be optimized reasonably by adjusting the shut-in time after fracturing to achieve the goals of increasing the production and the recovery ratio.

The above are not intended to limit the present invention in any form. Although the present invention has been disclosed as above with embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

The invention claimed is:

1. A method for predicting the optimal shut-in duration by coupling fluid flow and geological stress, comprising the following steps:
   Step 1: Establish a simulated physical model range to determine the basic parameters based on geological parameters, construction parameters, boundary conditions and initial conditions;
   Step 2: Establish a fracture propagation and stress interference model to obtain the fracture length, fracture width and reservoir stress distribution based on the basic parameters, in combination with the Reynolds equation, the fracture width equation and the reservoir elastic deformation equation;
   Step 3: Take the fracture length, fracture width and reservoir stress distribution obtained in Step 2 as the initial parameters, and calculate the oil saturation, pore pressure, and permeability and porosity after coupling change in different shut-in durations on the basis of the principle of fluid-solid coupling; and
   Step 4: Take the oil saturation, pore pressure, and permeability and porosity obtained in Step 3 as initial parameters and calculate the production corresponding to different shut-in time on the basis of the productivity model, and finally select the optimal shut-in time based on the principle of fastest cost recovery;
   wherein the following equation applies to the establishment of the fracture propagation and stress interference model is established based on the Reynolds equation, the fracture width equation and the reservoir elastic deformation equation in Step 2:

$$W(x) = \frac{2(1-v^2)H(P_f(x)-\sigma_n)}{E}$$

$$\frac{\pi}{64\mu_f}\frac{\partial}{\partial x}\left(W^3\frac{\partial(P_f-\sigma_n)}{\partial x}\right) = \frac{K\Delta x H \partial P_f}{\mu_f \partial y} + \frac{\pi}{4}\frac{\partial W}{\partial t}$$

$$Q_0 = \int 4HFdx + \frac{\pi H}{4}\int \frac{\Delta W}{\Delta t}dx$$

$$L_f = L_0 + \sum_{j=0}^{k}\Delta x_j$$

$$G\nabla^2 u_i + (G+\lambda)\frac{\partial}{\partial x_i}(\nabla \cdot u) = \alpha_p \frac{\partial p}{\partial x_i}$$

$$\sigma_{ij} = 2G\varepsilon_{ij} + \lambda\varepsilon_v\delta_{ij} - \alpha_p p\delta_{ij}$$

Where, W is the fracture width, in m; H is the fracture height, in m; E is the elastic modulus of the reservoir, in MPa; t is the construction time, in d; x is the abscissa of the model, in m; y is the ordinate of the model, in m; $\Delta x$ is the unit length of the fracture, in m; $P_f$ is the fracture fluid pressure, in MPa; $\mu_f$ is the viscosity of the injected fluid, in mPa·s; v is the Poisson's ratio of the reservoir rock, dimensionless; $\sigma_n$ is the minimum horizontal principal stress, in MPa; K is the fracture wall permeability, in $\mu m^2$; $Q_0$ is the injection rate, in $m^3/d$; F is the fluid loss rate, in m/d; $L_f$ is the fracture length, in $\mu m^2$; $L_0$ is the initial length of the fracture, in m; k is the total number of fracture division units, dimensionless; j is the $j^{th}$ fracture unit, dimensionless; G is the shear modulus of the rock, in MPa; $\lambda$ is the Lame constant, in MPa; $\delta_{ij}$ is the Kronecker symbol; p is the pore pressure, in MPa; $\varepsilon_{ij}$ is the strain component, dimensionless; $\varepsilon_v$ is the volumetric strain, dimensionless; $\alpha_p$ is the Biot constant, dimensionless; $u_i$ is the displacement of the reservoir in the i direction, in m; u is the displacement tensor, in m.

2. The method for predicting the optimal shut-in duration by coupling fluid flow and geological stress according to claim 1, wherein the geological parameters include initial permeability, initial porosity, elastic modulus and Poisson's ratio, and the construction parameters include injection displacement and fracturing fluid viscosity.

* * * * *